(12) United States Patent
Barber et al.

(10) Patent No.: US 12,452,280 B2
(45) Date of Patent: Oct. 21, 2025

(54) METHOD AND SYSTEM OF DETECTING COMPUTER NETWORK DATA LEAKS OVER OPTICAL CHANNELS

(71) Applicant: THE UNITED STATES OF AMERICA, AS REPRESENTED BY THE SECRETARY OF THE NAVY, Arlington, VA (US)

(72) Inventors: Don Edward Barber, Pacific Grove, CA (US); Vikram Krishna Kanth, Odenton, MD (US); Zachary White, Alexandria, VA (US); John Colin McEachen, Carmel-by-the-Sea, CA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 42 days.

(21) Appl. No.: 18/740,884

(22) Filed: Jun. 12, 2024

(65) Prior Publication Data
US 2024/0414181 A1      Dec. 12, 2024

Related U.S. Application Data

(60) Provisional application No. 63/472,459, filed on Jun. 12, 2023.

(51) Int. Cl.
*G06V 10/30*       (2022.01)
*G06V 10/60*       (2022.01)
(Continued)

(52) U.S. Cl.
CPC .......... *H04L 63/1425* (2013.01); *G06V 10/30* (2022.01); *G06V 10/60* (2022.01); *G06V 20/46* (2022.01); *G06V 20/49* (2022.01)

(58) Field of Classification Search
None
See application file for complete search history.

(56) References Cited

U.S. PATENT DOCUMENTS 6,311,214 B1    10/2001   Rhoads
7,406,214 B2    7/2008    Rhoads
(Continued)

FOREIGN PATENT DOCUMENTS

CN          105915916 B     8/2006

OTHER PUBLICATIONS

M. Guri, "Power-SUPPLaY: Leaking Sensitive Data from Air-Gapped, Audio-Gapped Systems by Turning the Power Supplies into Speakers," IEEE Transactions on Dependable and Secure Computing, 2021. https://ieeexplore.ieee.org/document/9640597/.
(Continued)

*Primary Examiner* — Cai Y Chen
(74) *Attorney, Agent, or Firm* — Heber Martin Carbajal; Scott Bell

(57) ABSTRACT

A method and system for detecting computer network data leaks over optical channels, for example using a mobile phone or other handheld device to rapidly scan a room with many light sources to identify the hidden transmission of data via optical steganography. The method of identification leverages spectral divergence created by the entropy produced by steganographically embedding data in the optical channel. The method and system proceed through multiple steps that can be computed in near real-time to eliminate background spectrum effects and isolate likely sources of information. The user or automated detection system captures a short video, and the video frames are then subdivided into smaller blocks effectively producing many adjacent videos of smaller pixel area.

20 Claims, 11 Drawing Sheets

(51) Int. Cl.
*G06V 20/40* (2022.01)
*H04L 9/40* (2022.01)

(56) References Cited

U.S. PATENT DOCUMENTS 8,281,138 B2    10/2012  Shi
2023/0095692 A1*  3/2023  Hong .................... G06V 20/49
                                            375/240.29

OTHER PUBLICATIONS

J. Loughry and D. Umphress, "Information leakage from optical emanations," ACM transactions on information and system security, vol. 5, No. 3, pp. 262-289, 2002.

M. Guri, D. Bykhovsky, and Y. Elovici, "aIR-Jumper: Covert Air-Gap Exfiltration/Infiltration via Security Cameras & Infrared (IR)," 2017.

M. Guri, "Optical Covert Channel from Air-Gapped Networks via Remote Orchestration of Router/Switch LEDs," in 2018 European Intelligence and Security Informatics Conference (EISIC). IEEE, 2018, pp. 54-60.

M. Guri, B. Zadov, A. Daidakulov, and Y. Elovici, "xLED: Covert Data Exfiltration from Air-Gapped Networks via Switch and Router LEDs," in 2018 16th Annual Conference on Privacy, Security and Trust (PST). IEEE, 2018, pp. 1-12.

M. Guri, B. Zadov, D. Bykhovsky, and Y. Elovici, "CTRL-ALT-LED: Leaking Data from Air-Gapped Computers via Keyboard LEDs," in 2019 IEEE 43rd Annual Computer Software and Applications Conference (COMPSAC), vol. 1. IEEE, 2019, pp. 801-810.

M. Guri, D. Bykhovsky, and Y. Elovici, "Brightness: Leaking Sensitive Data from Air-Gapped Workstations via Screen Brightness," in 2019 12th CMI Conference on Cybersecurity and Privacy (CMI). IEEE, 2019, pp. 1-6.

Cyber Security Labs at Ben Gurion University, "LED-it-GO. Jumping the Air-Gap with a small HardDrive LED," Feb. 22, 2017. [Online]. https://www.youtube.com/watch?v=4vlu8ld68fc.

G. J. Simmons, "The prisoners' problem and the subliminal channel," in Advances in Cryptology. Springer, 1984, pp. 51-67.

C. Cachin, "An information-theoretic model for steganography," Information and Computation, vol. 192, No. 1, pp. 41-56, Jul. 2004. [Online]. Available: https://linkinghub.elsevier.com/retrieve/pii/S0890540104000409. (accessed: Aug. 4, 2022).

H. Haas, L. Yin, Y. Wang, and C. Chen, "What is LiFi?" Journal of lightwave technology, vol. 34, No. 6, pp. 1533-1544, 2016.

Z. Zhou, W. Zhang, Z. Yang, and N. Yu, "Exfiltration of Data from Air-gapped Networks via Unmodulated LED Status Indicators," 2017.

S. Shady, D. I. A. Macleod, and H. S. Fisher, "Adaptation from Invisible Flicker," Proceedings of the National Academy of Sciences—PNAS, vol. 101, No. 14, pp. 5170-5173, 2004.

Z. Wang and p. R. Prucnal, "Optical Steganography Over a Public DPSK Channel With Asynchronous Detection," IEEE photonics technology letters, vol. 23, No. 1, pp. 48-50, 2011.

P. Laka and L. Maksymiuk, "Steganographic transmission in optical networks with the use of direct spread spectrum technique: Steganographic transmission using spectrum technique," Security and communication networks, vol. 9, No. 8, pp. 771-780, 2016.

Z. Ghassemlooy, W. Popoola, and S. Rajbhandari, Optical Wireless Communications: System and Channel Modelling with MATLAB®, Second Edition. Milton: CRC Press, 2019.

A. A. Purwita, C. Chen, D. A. Basnayaka, and H. Haas, "Aggregate Signal Interference of Downlink LiFi Networks," in GLOBECOM 2017—2017 IEEE Global Communications Conference. IEEE,2017, pp. 1-6.

Wojciech Mazurczyk and Luca Caviglione 'Steganography in Modern Smartphones and Mitigation Techniques' [2014] and 'Information Hiding as a Challenge for Malware Detection' [2015].

* cited by examiner

METHOD AND SYSTEM OF DETECTING COMPUTER NETWORK DATA LEAKS OVER OPTICAL CHANNELS

CROSS REFERENCE TO RELATED PATENT(S) AND APPLICATION(S)

This application claims the benefit of U.S. Provisional Application No. 63/472,459, filed Jun. 12, 2023, and entitled METHOD OF DETECTING COMPUTER NETWORK DATA LEAKS OVER OPTICAL CHANNELS, which is hereby incorporated in its entirety by reference.

STATEMENT OF GOVERNMENT INTEREST

The present disclosure was made in the performance of official duties by one or more employees of the Department of the Navy, and thus, embodiments herein may be manufactured, used or licensed by or for the Government of the United States of America for governmental purposes without the payment of any royalties thereon or therefor.

BACKGROUND

This disclosure, and the exemplary embodiments described herein, describe methods and systems for detecting computer network data leaks over communication channels. The implementation described herein is related to systems and methods for implementation in or detecting computer network data leaks over optical communication channels however it is to be understood that the scope of this disclosure is not limited to such application.

BRIEF DESCRIPTION

In accordance with one exemplary embodiment of the present disclosure, disclosed is a method for method of detecting computer network data leaks over optical channels comprising: capturing a video clip of a target area; subdividing frames of the video clip into smaller blocks to generate a plurality of video clips; applying a fast Fourier transform to each of the video clips to generate a corresponding frequency domain representation of an average luminance of each of the video clips; applying a bandpass filter to each of the frequency domain representations to eliminate strong tones present throughout the video clips; analyzing the bandpass filtered representations to assess spectral divergence of the bandpass filtered frequency domain representations; and identifying suspect transmissions as areas of relatively high spectral entropy within the video clips.

In accordance with another exemplary embodiment of the present disclosure, disclosed is a system for system for detecting computer network data leaks over optical channels comprising: a video capturing device; and a video processing unit operatively associated with the video capturing device; the system performing a method of detecting computer network data leaks over optical channels comprising: capturing a video clip of a target area; subdividing frames of the video clip into smaller blocks to generate a plurality of video clips; applying a fast Fourier transform to each of the video clips to generate a corresponding frequency domain representation of an average luminance of each of the video clips; applying a bandpass filter to each of the frequency domain representations to eliminate strong tones present throughout the video clips; analyzing the bandpass filtered representations to assess spectral divergence of the bandpass filtered frequency domain representations; and identifying suspect transmissions as areas of relatively high spectral entropy within the video clips.

In accordance with another exemplary embodiment of the present disclosure, disclosed is a method of detecting computer network data leaks over optical channels comprising: capturing a video clip of a target area; subdividing frames of the video clip into smaller blocks to generate a plurality of video clips; generating a corresponding frequency domain representation of an average luminance of each of the video clips; applying a bandpass filter to each of the frequency domain representations to eliminate strong tones present throughout the video clips; analyzing the bandpass filtered representations to assess spectral divergence of the bandpass filtered frequency domain representations; and identifying suspect transmissions as areas of relatively high spectral entropy within the video clips.

BRIEF DESCRIPTION OF THE DRAWINGS

For a more complete understanding of the present disclosure, reference is now made to the following descriptions taken in conjunction with the accompanying drawings.

FIGS. 6A and 6B shows the power spectrum of the covered environment of FIG. 5, FIG. 6A with everything off and FIG. 6B with only the lamp and monitor on.

DETAILED DESCRIPTION

Figure 1:
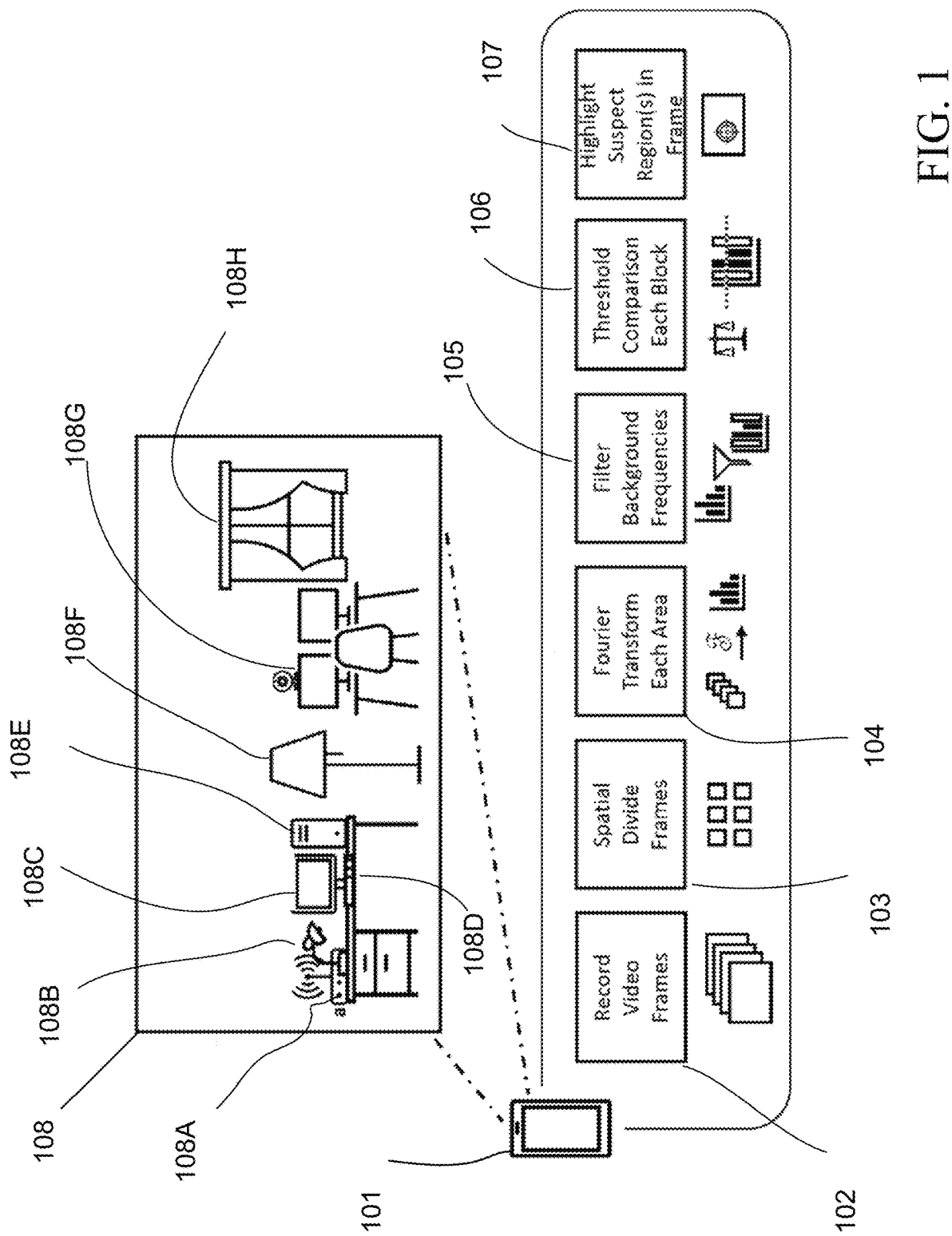
FIG. 1 shows a method of detecting computer network data leaks over optical channels according to an example embodiment of this disclosure.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed The following list of references are cited within the text of this disclosure.

[Ref. 1] M. Guri, "POWER-SUPPLaY: Leaking Sensitive Data from Air-Gapped, Audio-Gapped Systems by Turning the Power Supplies into Speakers," IEEE Transactions on Dependable and Secure Computing, 2021.

[Ref. 2] J. Loughry and D. Umphress, "Information leakage from optical emanations," ACM transactions on information and system security, vol. 5, no. 3, pp. 262-289, 2002.

[Ref. 3] M. Guri, D. Bykhovsky, and Y. Elovici, "aIR-Jumper: Covert AirGap Exfiltration/Infiltration via Security Cameras & Infrared (IR)," 2017.

[Ref. 4] M. Guri, "Optical Covert Channel from Air-Gapped Networks via Remote Orchestration of Router/Switch LEDs," in 2018 European Intelligence and Security Informatics Conference (EISIC). IEEE, 2018, pp. 54-60.

[Ref. 5] M. Guri, B. Zadov, A. Daidakulov, and Y. Elovici, "xLED: Covert Data Exfiltration from Air-Gapped Networks via Switch and Router LEDs," in 2018 16th Annual Conference on Privacy, Security and Trust (PST). IEEE, 2018, pp. 1-12.

[Ref. 6] M. Guri, B. Zadov, D. Bykhovsky, and Y. Elovici, "CTRL-ALT-LED: Leaking Data from Air-Gapped Computers Via Keyboard LEDs," in 2019 IEEE 43rd Annual Computer Software and Applications Conference (COMPSAC), vol. 1. IEEE, 2019, pp. 801-810.

[Ref. 7] M. Guri, D. Bykhovsky, and Y. Elovici, "Brightness: Leaking Sensitive Data from Air-Gapped Workstations via Screen Brightness," in 2019 12th CMI Conference on Cybersecurity and Privacy (CMI). IEEE, 2019, pp. 1-6.

[Ref. 8] Cyber Security Labs at Ben Gurion University, "LED-it-GO. Jumping the Air-Gap with a small Hard-Drive LED," Feb. 22, 2017.

[Ref. 9] G. J. Simmons, "The prisoners' problem and the subliminal channel," in Advances in Cryptology, Springer, 1984, pp. 51-67.

[Ref. 10] C. Cachin, "An information-theoretic model for steganography," Information and Computation, vol. 192, no. 1, pp. 41-56, July 2004.

[Ref. 11] H. Haas, L. Yin, Y. Wang, and C. Chen, "What is LiFi?" Journal of lightwave technology, vol. 34, no. 6, pp. 1533-1544, 2016.

[Ref. 12] Z. Zhou, W. Zhang, Z. Yang, and N. Yu, "Exfiltration of Data from Air-gapped Networks via Unmodulated LED Status Indicators," 2017.

[Ref. 13] S. Shady, D. I. A. Macleod, and H. S. Fisher, "Adaptation from Invisible Flicker," Proceedings of the National Academy of Sciences—PNAS, vol. 101, no. 14, pp. 5170-5173, 2004.

[Ref. 14] Z. Wang and P. R. Prucnal, "Optical Steganography Over a Public DPSK Channel With Asynchronous Detection," IEEE photonics technology letters, vol. 23, no. 1, pp. 48-50, 2011.

[Ref. 15] P. Laka and L. Maksymiuk, "Steganographic transmission in optical networks with the use of direct spread spectrum technique: Steganographic transmission using spectrum technique," Security and communication networks, vol. 9, no. 8, pp. 771-780, 2016.

[Ref. 16] Z. Ghassemlooy, W. Popoola, and S. Rajbhandari, Optical Wireless Communications: System and Channel Modelling with MATLAB®, Second Edition. Milton: CRC Press, 2019.

[Ref. 17] A. A. Purwita, C. Chen, D. A. Basnayaka, and H. Haas, "Aggregate Signal Interference of Downlink LiFi Networks," in GLOBECOM 2017-2017 IEEE Global Communications Conference. IEEE, 2017, pp. 1-6.

This disclosure and exemplary embodiments described herein provide a scalable means of detecting anomalous transmissions to enable cybersecurity processionals to localize potential out-of-band optical leaks around critical networks.

Preventing the exfiltration of critical data via out-of-band channels is one of the most difficult challenges in cybersecurity. This challenge notably includes communications utilizing optical channels. Numerous papers have suggested the modulation of indicator lights to transmit information out of otherwise secure networks. These means of optically embedding data are both challenging to detect and a threat to the security of confidential data. This paper presents a scalable, near-real-time process to detect and localize data hidden in optical channels amid other optical modulation, including electric network frequencies. Assumptions on the detectability of hidden optical channels are reviewed and a method and system of detecting and localizing transmissions based on spectral artifacts of embedded data is developed. Proof-of concept experiments demonstrate the successful detection of potential optical data leaks in an office environment. This capability can allow for low cost optical bug sweeping devices, arming information security teams with a tool to detect and mitigate the insidious threat of optical out-of-band channels.

With reference to FIG. 1, shown is a method of detecting computer network data leaks over optical channels according to an example embodiment of this disclosure, for example using aa mobile phone or other handheld device to rapidly scan a room with many light sources to identify the hidden transmission of data via optical steganography.

The means of identification leverages spectral divergence created by the entropy produced by steganographically embedding data in the optical channel. While such systems are designed to flicker faster than human persistence of vision to evade detection spectral components can still be collected with commodity hardware. At the same time, spectral components alone do not strongly signal the presence of a hidden optical signal, since ambient light has some spectral noise and typical devices such as monitors and lamps can produce strong spectral components, often at 50 or 60 Hz associated with the frequency of outlet power and video displays.

The method described in this disclosure proceeds through multiple steps that can be computed in near real-time to eliminate these background spectrum effects and isolate likely sources of information. First, the user captures a short video clip (seconds) holding the device still to allow the recording of frames of video 102. These frames are then subdivided into smaller blocks 103 effectively producing many adjacent videos of smaller pixel area. This chipping step provides a tradeoff between speed and spatial resolution, where higher spatial resolution is slower to process, but provides more precise location and reduces relative background noise in the area searched. The greater the percentage of the chip that is filled with the signal of interest, the data leak, the stronger the detected entropy divergence will be. If the chip is significantly larger than the transmitting light, the entropy signal will still be received, but, since it is mixed with more background, it will show lower divergence from the background and be more difficult to detect.

Within each of these video chips, the Fast Fourier Transform of the average luminance is calculated, producing a frequency domain representation of each spatial area in the scene 104. This frequency representation is then bandpass filtered to eliminate strong tones present throughout the entire scene 105. Again, strong components in the 50-60 Hz range are always expected and do not indicate visual steganography. In fact, it would be difficult to hide data here due to the same signal-to-noise consideration previously addressed.

Having filtered tones that are common across the entire scene, the most critical step in the disclosed detection approach is to assess spectral divergence within the passband. Sending a consistent string of bits, such as 0101010101 . . . , will produce a single tone, but also conveys almost no information. If data is encoded on the bitstream to leak data from a network, then the space between 1s and 0s will vary, producing spectral components at various frequencies. Since there is always some noise in the environment, and sensors system, a threshold comparison 106 is used to identify suspect information transmission by looking for energy in the filter passband.

Finally, areas with high spectral entropy are highlighted in an overlay of the video scene 107 allowing focused analysis and, if necessary, cybersecurity threat mitigation. This process allows an office environment 108 to be rapidly scanned for suspect activity across network devices 108A monitors 108C, keyboard status lights 108D, hard drive status LEDs 108E, and other peripheral indicator lights 108G even in the presence of task lighting 108B, room lighting 108F, and outside ambient noise 108H. Where individually analyzing every potential light source for data leaks is impractical to scale, the ability to conduct bug sweeps for out-of-band optical leaks provides a means to enhance the protection of critical digital data.

I. INTRODUCTION

Critical data stored electronically span corporate intellectual property to financial and medical records—the cybersecurity threat posed by this data being leaked or stolen is clear. However, almost all cybersecurity relies on monitoring traffic within the network. Out-of-band channels that transmit data without using the data network present a significant challenge for network defenders. Out of-band channels using heat, sound, or light can leak data from computers that are highly guarded by firewalls or even physically disconnected from the Internet [Ref. 1]. Of these possible sources of leaks, light can carry the most information and cover the longest ranges.

The literature on optical out-of-band channels provides numerous examples of surreptitious transmission of data from computers and networks otherwise isolated from the Internet leveraging light sources, such as light-emitting diode (LED) status lights. Joe Loughry and David Umpress [Ref. 2] first documented the hazards of unintentional optical leakage data in 2002. More recently, Mordechai Guri et al. have continued to study possibilities of intentionally modulating light sources to transmit information over air gaps, including using infra-red illuminators of security cameras [Ref. 3], lights on switches and routers [Ref. 4] [Ref. 5], keyboards [Ref. 6], and even monitor brightness [Ref. 7]. In an impressive, and somewhat frightening demonstration [Ref. 8] data was exfiltrated from a blinking hard drive light to a drone flying outside a building at night.

However, despite the threat posed by out-of-band optical channels, there are challenges in embedding data in an optical channel while avoiding detection. Undetected transmission of optically embedded data presents the same challenges as all steganographic schemes. Tradeoffs must be made between blending in with the environment (detectability) and information being sent (throughput) based on the communication media.

This disclosure presents a way for network defenders to detect optical data leaks by capitalizing on the presence of information in a threat actor's message. Specifically, described is an embedded communication detection algorithm combining elements of information theory, image processing, and frequency analysis. Furthermore, shown is the validity and utility of the disclosed detection method through proof-of-concept demonstrations in relevant office settings.

Section II provides background information outlining constraints on data embedded in a scene and the mathematical basis for its detection. Section III describes the disclosed process for the detection of embedded optical signals. Section IV outlines an experimental setup and initial results, successfully localizing data leaks from an LED and modulating monitor. Finally, conclusions relevant to information security applications is presented in Section V.

II. BACKGROUND

In this section, presented are some of the foundational concepts underlying the disclosed methodology for detection of optically embedded signals. Initially, a brief overview of steganography, hiding data within public messages, is provided. Then examined are communications in optical channels and the basic assumptions of detectability presented in the literature on optical exfiltration of data.

A. Steganography

A classic model for steganographic communications, the prisoners' problem, was presented by Gustavus Simmons [Ref. 9]. Two prisoners are allowed to communicate, but the warden monitors all their communications. To plan their escape, the prisoners must conceal their discussion within authorized communications. If the warden detects anomalous messages or suspects their escape plans, they will be punished and isolated.

The prisoners' problem provides an abstract model of the steganographic channel. The goal is for two parties to communicate without being detected by network monitors.

This goal can be defined using information theory. In his seminal work on steganography, Christian Cachin [Ref. 10] defines a perfectly secure stegosystem as a system where the warden cannot distinguish between the statistical distributions of the cover text and the stegotext. He then defines a steganographic system that is e-secure against passive adversaries as:

$$D(P_C \| P_S) \le \epsilon \qquad (1)$$

where PC is the probability distribution of the cover text and PS is the probability distribution of the stegotext. The function D(PC∥PS) is the Kullback-Liebler (KL) divergence or relative entropy, which is defined as:

$$D(P_c \| P_s) = \sum_{x \in X} P_c(x) \log \frac{P_c(x)}{P_s(x)} \qquad (2)$$

where X is the space of possible measurements. Importantly, the relative entropy is zero if and only if the distributions PC and PS are equal. This leads to Cachin's definition of a perfectly secure stegosystem, an e-secure stegosystem where $\epsilon=0$. The divergence in distribution between the normal behavior of lights and lights being modulated with data is capitalized on to identify optical data leaks.

Analogous to the escape planning in the prisoners' problem, embedded optical communications present a scenario where a threat actor hides information on an LED and transmits it to a collaborating partner outside the network while seeking to avoid detection. As discussed in Section I, this capability has been demonstrated numerous times in the literature. The challenge for the network security team is to detect the presence of an embedded communication so the threat can be mitigated.

B. Communicating in the Optical Channel

A basic communications system is composed of three parts: a transmitter, a channel through which the message propagates, and a receiver. Optical transmission can emanate from many ubiquitous sources, including monitors, LED indicators, or even light fixtures as employed by LiFi [Ref. 11] and other visible light communication (VLC).

Bits are generally encoded as changes in the brightness of the transmitter. Using LEDs to transmit data relies on modulating their brightness to encode data both for overt VLC and in the techniques presented in the literature for out-of-band optical data exfiltration. Similarly, subtle changes in a monitor's brightness can be used for data exfiltration.

Several factors can impact an optical signal in the channel. Ambient brightness, angles, and distances all affect the received signal-to-noise ratio (SNR). However, in an office environment, most atmospheric effects will not significantly distort the signal. If communications are shielded, the optical communication channel will cease. Recalling the demonstration of a drone outside a window collecting a signal from a blinking hard drive light in [Ref. 8], if the curtains were closed, no data could be stolen. If the channel is so bad that the threat actor cannot see the modulation, there is no risk. However, it is difficult to know where the threat is receiving data. It may not be outside a window; it could be on another device in the room. In this case, despite shielding efforts, the security team still needs to be able to check for optical data leaks in the environment.

At the receiver, most optical communications rely on either a photodiode to translate light into an electrical signal or, more commonly, an imaging camera recording video. Assessing the use of router and switch LEDs to transmit data, Guri et al. found camera frame rate to be a limiting factor for data rate, with 2-3 frames per symbol required to effectively capture LED modulation [Ref. 5]. Table I below is modified from their work capturing the relative capabilities of various commercially available cameras.

TABLE 1

Maximum Bit Rate for Different Cameras

| Tested Camera/Sensor | FPS | Single LED |
|---|---|---|
| Entry Level DSLR (Nikon D7100) | 60 | 15 bits/s |
| Security Camera (Sony SNC-EB600) | | |
| Extreme Camera (GoPro HERO5) | 60-240 | 100-120 bits/s |
| Webcam (HD) (Microsoft LifeCam) | 30-120 | 15-60 bits/s |
| Smart Phone (Samsung Galaxy S6) | 30 | 15 bits/s |

C. Visual Concealment

While optical communications offer many advantages, they are literally visible. Detecting a surreptitious radio transmitter requires a bug sweeping device to detect its transmissions, but a blinking light could potentially be seen by anyone. Successfully employing the optical channel for undetected communications requires blending into the existing environment. This blending in is analogous to steganographic messages embedded in image files, anyone can see the surface-level picture, but the presence of the message is undetectable.

Given this requirement, any embedding modulating displays or LEDs to exfiltrate data must also be imperceptible or in line with expected behavior. In a most cursory sense, LED blinking must be limited to changes within 40-50 milliseconds so that persistence of vision will make it appear continuous [Ref. 12]. With a small amount of rearranging, this rate sets a bare minimum threshold at $\frac{1}{40} \cdot 10{-}3$ s$=25$ Hz.

However, this flicker is not truly undetectable. While color flicker is generally only perceived at this rate, brightness flicker is noticeable up to 50 Hz [Ref. 13]. Flicker perception can depend on many factors, including brightness and adaptation to flicker. 25 Hz is an optimistic lower bound. Modern displays have adapted 60 FPS as a more acceptable refresh rate to provide comfortable viewing. As part of that ecosystem, many of the sensors described in Table I also have been engineered to capture at 30 or 60 FPS. Unfortunately, this presents potential challenges for detectability as slowing modulated pulses down to be collected by commodity cameras moves them into the range of perceptible flicker.

Significant research has been conducted into stealth optical channels as they pertain to guided light in fiber optic communications [Ref. 14], [Ref. 15], but intensity modulation of LEDs does not readily support them. The detectability of optical communications in VLC is generally described by a dimming constraint [Ref. 16], but intensity modulation is not stealthy in the frequency domain.

Another consideration in an optical communications channel is interference. Interference, as it applies to overt VLC networks has been studied [Ref. 17], as well as techniques to mitigate it through OFDM. Surreptitiously using existing indicator LEDs to exfiltrate data limits the opportunity to employ OFDM techniques, since the threat actor will have little to no control over specific colors or arrangement of lights. As such, embedded optical communications to exfiltrate data are primarily limited to pulse modulation schemes, such as on-off keying or pulse position modulation [Ref. 16].

III. METHOD

This section described a basic approach to detecting embedded optical signals according to this disclosure, and example embodiments provided herein. A model of the environment is established as a baseline, including typical sources of interference in an office environment. From that model, mathematically assessed is the structure of interferers in the environment in the time and frequency domains. The spectral characteristics of the hidden optical communications described in the literature are shown, illustrating divergence in distribution. In addition, described is an experimental method to validate the assumptions and the basic software algorithm to detect spectral divergence.

A. Analytic Model for Signal and Noise Power

Figure 2:
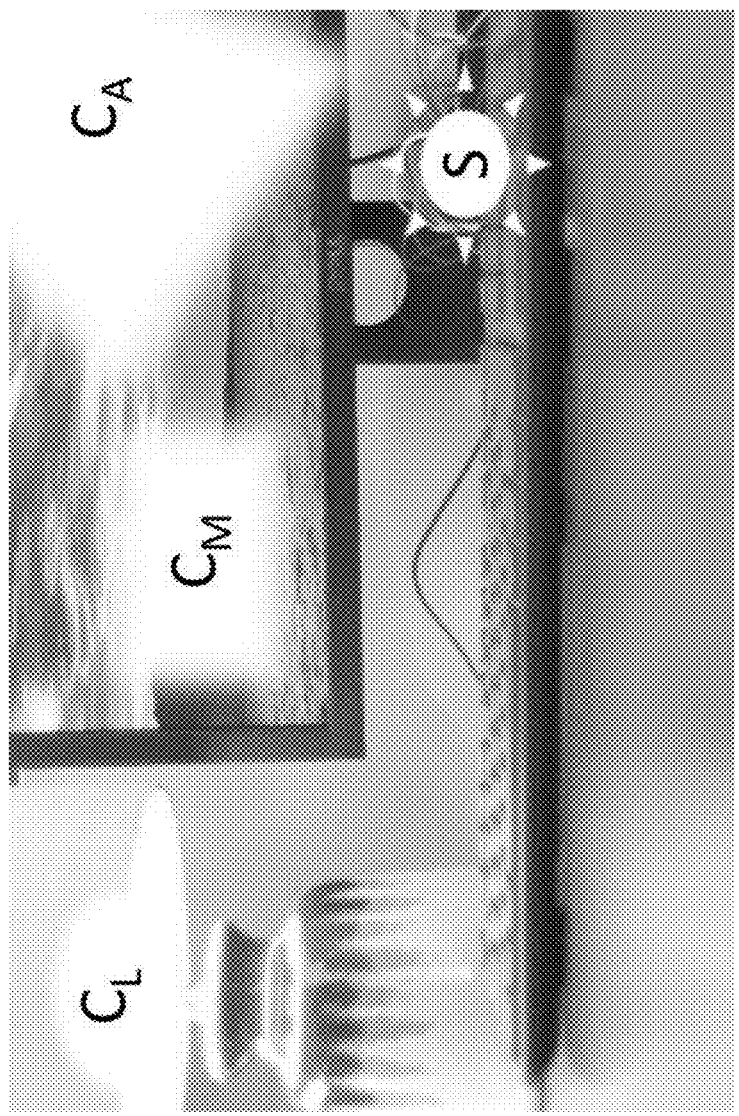
FIG. 2 shows an example scene with 3 ambient condition sources (CL, CM and CA) and an LED signal source(S).

Initially, established is a sample scenario to assess the observable impacts of optically embedding data with a modulated LED. FIG. 2 shows an example scene with three ambient condition sources and an LED. The LED to be modulated is labeled S on the keyboard. CA represents ambient light, which is assumed to be constant with some Gaussian noise. Other modulated light sources in the scene include a lamp, CL, and a computer monitor, CM, which will be modeled as sinusoids. Assuming 60 Hz power, the power from the lamp is modeled as sin 2(60). Then, leveraging the double angle identity:

$$\sin^2(60) = \frac{1}{2}(1 - \cos(2 \times 60)) = \frac{1}{2}(1 - \cos(2 \times 120)) \quad (3)$$

and the luminance of the lamp has an all positive, 120 Hz cycle, smoothed by the persistence of the heated filament or fluorescent.

For simplicity, the computer monitor was initially modeled as a 60 Hz sinusoid, mirroring a typical refresh rate of 60 Hz and assuming more subtle grey-to-grey changes rather than a strobing effect.

Modeling the various sources assuming average power is constant and does not impact the overall sensor reading, ambient light is simply additive white Gaussian noise. The lamp is a 120 Hz sinusoid, and the monitor is a 60 Hz sinusoid. It is noted that any phase offset will change the shape of these interacting components in the time domain, but not their spectral content.

To assess the power of the ambient signal, the power spectral density is calculated indirectly via the autocorrelation. Leveraging the Wiener-Khintchine-Einstein Theorem, the power spectral density can be calculated as the Fourier transform of the autocorrelation. Then, assuming the Gaussian ambient noise and the phase shifts of the lamp and monitor are independent, a simple piecewise approximation of the overall noise power can be developed. Initially, a definition of the autocorrelation is defined, expanded, and then canceling the independent cross terms with an assumption that the noise signals are zero mean, and their phases vary uniformly from 0 to $2\pi$:

$$R_{XX} = E[(C_A + C_L + C_M)(C_A + C_L + C_M)^*] = E[(CA2 + CL2 + CM2 + 2CACL + 2CACM + 2CLCM] = E[C_A^2] + E[C_L^2] + E[C_M^2] \quad (4)$$

Plugging back in the parameters and leveraging the product-sum identity for cosines yields:

$$R_{xx} = \sigma_A^2(\tau) + \frac{1}{4}(1 - \cos(2\pi 120\tau)) + \frac{1}{2}(\cos(2\pi 60\tau)) \quad (5)$$

which is intuitively what is expected in the time domain. The Fourier transform then produces the power spectral density of noise as $$S_{xx} = \sigma_A^2 + \frac{1}{4}\delta(f) + \frac{1}{8}(\delta(f - 120) + \delta(f + 120)) \quad (6)$$

that informs the spectral shape of the background noise with some floor defined by $\sigma_A^2$ and larger spikes from the deltas at 60 Hz harmonics (including 120 Hz).

Throughout this calculation, the actual amplitude of the noise has been omitted. Specific amplitudes will vary based on geometry and distances, and the autocorrelation function holds without loss of generality. In assessing the impact of combining the LED signal with these other ambient sources, one must consider each ambient source spreads as it is radiated. Only a small portion of this light is incident on or near the LED and scatters. The scattered light from the ambient sources and the light directly emitted from the LED in the direction of the camera are combined producing an overall value received by the camera sensor.

If the magnitude of the ambient sources overwhelms the direct energy from the LED reaching the camera, the signal will not be directly visible. Scoping this investigation to a scenario where embedded optical communications are leaking data from the network, it is assumed the amplitude of the LED signal is greater than the sum of the amplitudes of the other ambient sources' scattering. The assumption of detectable signal levels allows us to focus on frequency interactions between the source, environment, and sensor. This approach also creates a more general framework, rather than specifying the exact angles and distances for every unique instantiation of scenes such as the one in FIG. 2.

Threat actors are constrained by hardware of opportunity on the target device and the embedded optical communication must have sufficient SNR to support data throughput. Thus, they will generally want to avoid concentrating their communications in the highest noise bands, such as electric network frequency driving light fixtures and monitor refresh rates.

Knowing optically embedded communications have some constraints, the challenge is identifying anomalous behavior. Network defenders generally do not have the resources to individually analyze every single light source in a room (much less a building). Analyzing a whole scene, even as zoomed in as in FIG. 2, the power from ambient sources will likely mask any signal. The threat actors have a reduced problem space. They know what kind of lights they are using to leak information, which helps them know where to look.

B. Detection Approach Identifying Embedded Information

A key contribution of this disclosure is enabling network defenders to detect optical leaks is the insight that leaked information will produce discernible frequency artifacts. Foundational to information theory, information is quantified as uncertainty. The toss of a fair coin produces one bit of data since it is unknown if it will be heads or tails. In the embedded optical channel, ones and zeroes are sent, and it is their varying pattern that carries information. If the transmitter were static, it would be analogous to tossing a two-headed coin, the receiver learns nothing new by watching it. For an optical out-of-band channel to leak data, it must contain a varying sequence of bits conveying the leaked information.

Figures 3A, 3B:
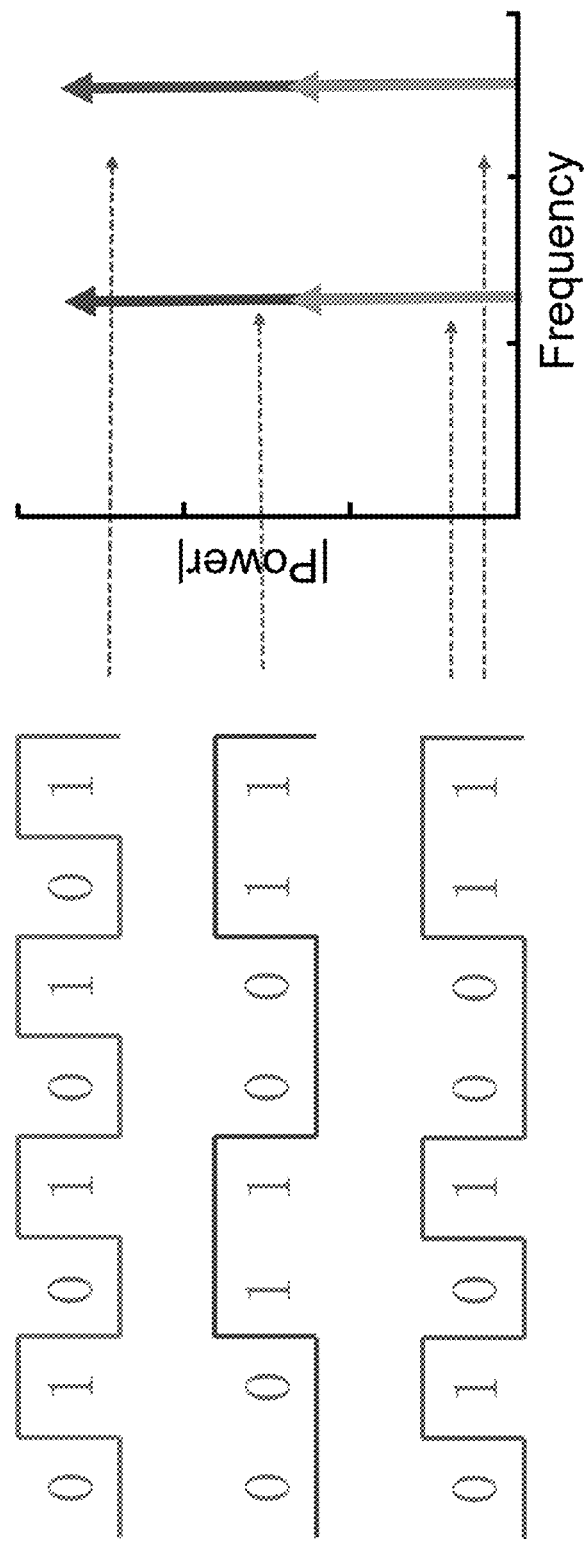
FIGS. 3A and 3B shows bits in time (3A) and corresponding spectral components (3B) for example bit patterns.

Entropy from whatever bits are being exfiltrated will make the signal's spectral content deviate from the background, even if the background has many other emitters. Since the pattern of bits sent varies in an uncertain way (it contains information), it will contain varied spectral components. For instance, as illustrated in FIG. 3, a pattern '01010101' has spectral energy at twice the frequency of '00110011'. The pattern '01010011' contains both of those frequency components, but with half as much energy at each peak in the power spectral density.

Figure 4:
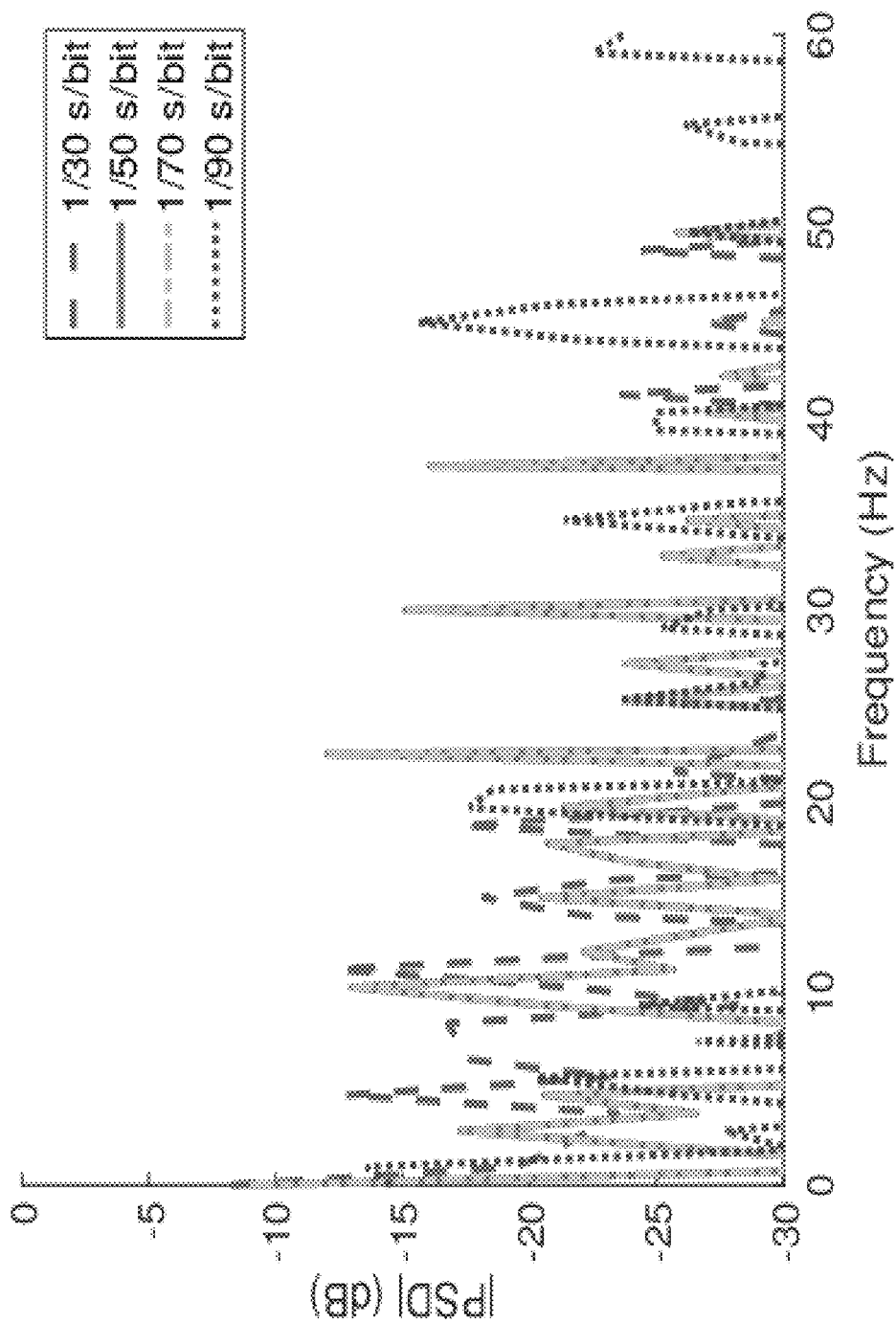
FIG. 4 shows the spectral effect of sending a bit sequence at 4 different bit rates, i.e., spectrum of bits with varying duration.

FIG. 4 shows the spectral effect of sending the sequence '01001110 01010000 01010011' at four different bit rates. Varying distance between ones and zeroes in the code generates varying frequencies that show up between the primary interferers at DC and 60 Hz. Interferers and some noise manifest as strong tones or larger amplitudes in the frequency domain at or near DC or powerline frequencies and are preferably filtered out using bandpass filtering techniques. While there is always some noise from the environment, thermal noise, and other effects in the camera, there is significantly more spectral energy where light is being modulated. Using other binary codes and even randomly generated bits shows the same result.

Recalling the divergence in distributions discussed in Section II, the spectral deviation caused by the presence of information represents a non-zero e value and can be detected. Given the constraint in Section II-C, where expected is optically embedding data on the LED to be limited to pulse duration or position techniques, any attempt to send information will generate KL-divergence from the ambient environment. In fact, the deviance is so high that two standard deviations above the mean was used as the initial threshold for suspect blocks.

C. Experimental Set Up

In order to identify an embedded optical signal, short video clips were analyzed. Blocks across the video frame with the greatest divergence from the background environment were identified as candidates for further investigation.

Figure 5:
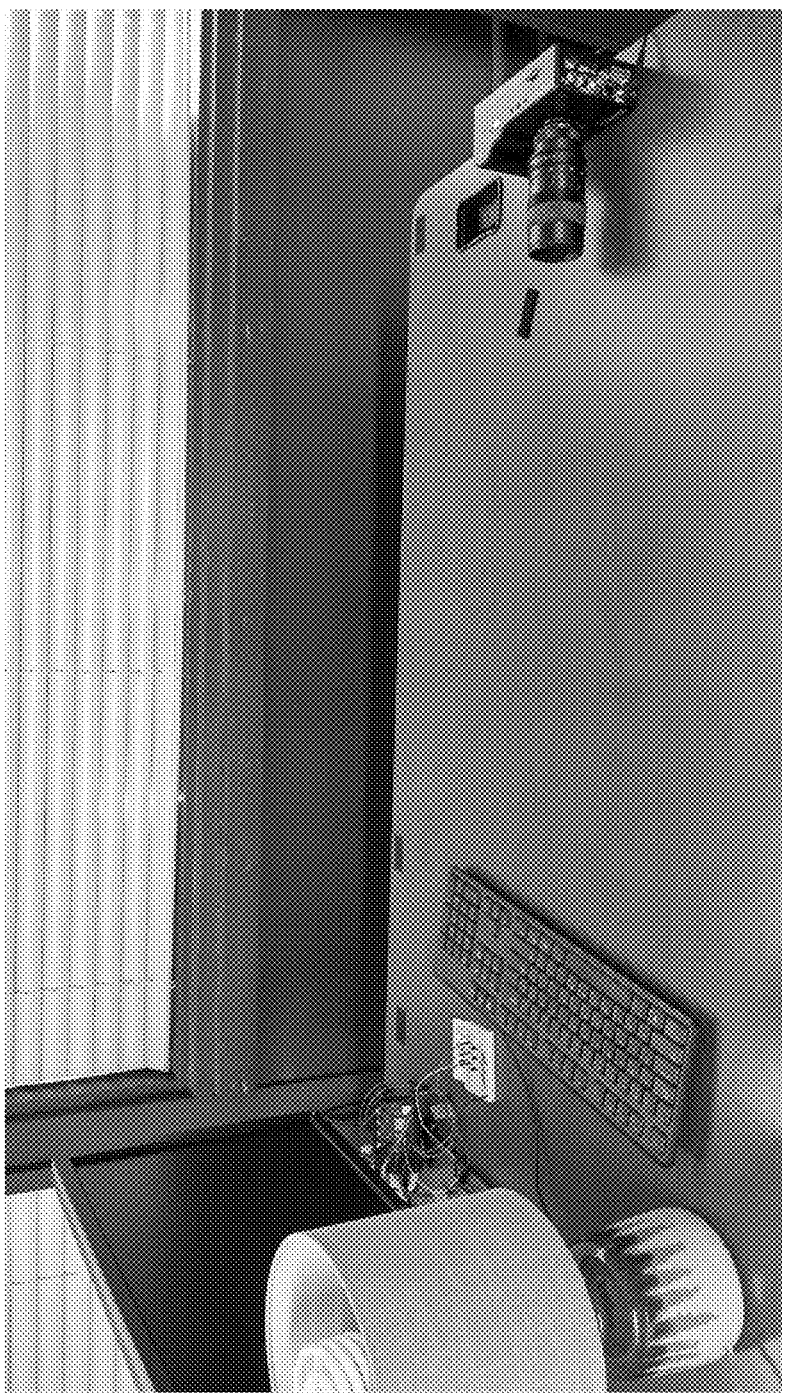
FIG. 5 shows an experimental camera set up to capture video of a target area associated with a method of detecting computer network data leaks over optical channels according to an example embodiment of this disclosure.

The first round of experimentation was conducted using an LED driven by a RASPBERRY PI microcomputer to simulate a keyboard LED. An ambient scene was constructed using a fluorescent desk lamp and DELL computer monitor set up on a desk next to a window. A camera was set up directly in front of the scene to capture video as shown in FIG. 5. After initial collection at 1 meter, the camera was moved from the desk to a tripod at 2 meters and then 3 meters increasing the complexity of the scene and reducing the relative LED power in the frame.

Video was collected at 120 Hz and 240 Hz mirroring the slow-motion mode capabilities of commodity cell phone cameras. First, videos were taken as controls with everything turned off, then with the interfering lamp and monitor turned on, and finally with optically embedded bit patterns transmitted by the LED. Varied bit patterns were used to ensure results were not an artifact of one specific string. Bit strings included: '01001110 01010000 01010011', '01010101 01010011 01001110 01000001', and finally '01000110 01001001 01001110 01000100 01000111 01010101 01010010 01001001'.

Figure 10:
FIG. 10 shows monitor modulation detected in an office setting according to an example embodiment of this disclosure.

A second round of experimentation examined a larger office scene with data embedded as changes in the brightness of a monitor, as presented in [Ref. 7]. The office scene was set up with three identical Samsung monitors driven by three independent DELL workstations, as seen in FIG. 10. The displayed image on each screen was coded using basic HTML and rendered in the Edge browser. Two of the three workstations displayed solid grey (#707070) and one subtly modulated '1001110 1010000 1010011' varying the displayed shade of grey. Collection was again conducted at 120 and 240 Hz.

Video files were downloaded from the camera and processed in MATLAB. For the LED recordings, MATLAB was configured to scan across 80 128×128 chips in each frame and find the fast Fourier transform (FFT) of the block average luminance. For the monitor experiments, the same technique was used with the block size adjusted for a widescreen format. The FFT was analyzed to look for maximum spectral density in the passband, and the most likely blocks were highlighted.

Below is a listing of pseudo-code according to an example embodiment of this disclosure.

```
Acquire Video Clip //(from file or camera memory buffer
    directly)
Establish Data Structure //(m × n × l matrix based on the
    size in blocks by clip length in frames)
/* block size is a configurable variable based on scene
    density and camera resolution, with bigger blocks
    requiring less processing time at the expense of resolution
    and increased noise */
Preprocess Video Clip
    FOR (all frames)
        Convert RGB to luminance values
        Average across block size areas
        Store into the 3-dimensional matrix
    END
Convert Block Luminance Values to Spectral Domain
    and Sum Anomalous Energy
    FOR (each clip length vector (m=1 to length m and
    n = 1 to length n)
        Take FFT of the 1 × 1 vector
        Sum spectral values between DC and
    powerline cut-offs //(the spectral entropy energy)
    /* DC cut-off (lower bound) should be several Hz above
    zero to reject approximately constant background and
    aliases to zero, while the power line cut-off (upper bound)
    should be several Hz below the power line frequency as
    aliased closest to baseband in the camera */
        Store sum value into m × n matrix at the
    corresponding location to the loop iteration
    END
Compare Summation Values to Detection Threshold
    and Plot
    Display a frame of the scene and hold
    IF (calibrated)
        Use appropriate threshold value
        FOR (summation value in the m × n matrix
    (m=1 to length m and n = 1 to length n))
            IF (summation value > threshold)
                Highlight block on the frame
    image
        END
    END
    ELSE IF (unknown environment)
        Find max of the m × n matrix
        Highlight the associated block as having
    maximum spectral entropy
        FOR (summation value in the m × n matrix
    (m=1 to length m and n = 1 to length n))
            IF (summation value > chosen % of
    maximum value)
                Highlight block on the frame
    image
        END
    END
END
Automate IT alerts and/or allow operator review of
    flagged areas
```

Appropriate threshold hold values for threshold comparison may be established by establishing a baseline noise threshold based at least on part on the average spectral characteristics of the overall video, such as but not limited to modulation rates and spectral amplitude.

IV. EXPERIMENTAL DATA AND RESULTS

Figures 6A, 6B:
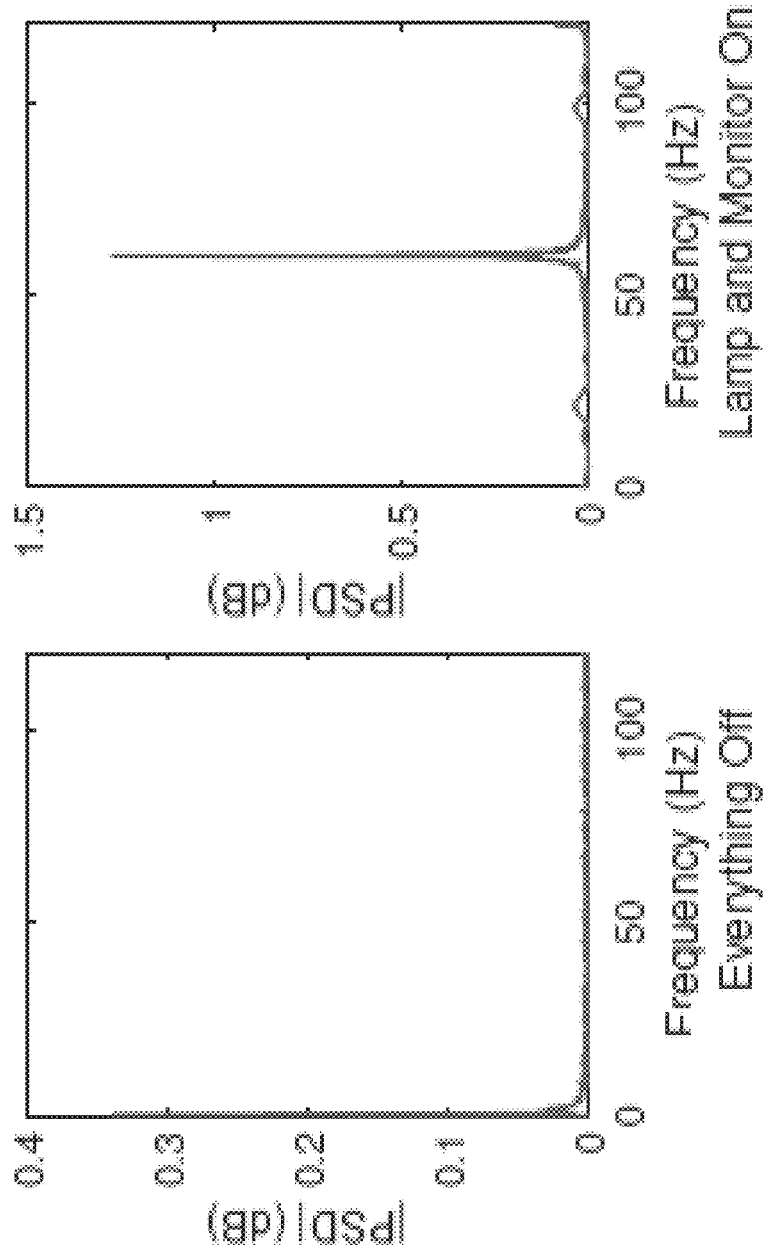

Experimental results validated the assumptions in the disclosed model and experimental design. The power spectrum of the control scene with everything off approximated Gaussian white noise and the spectrum with only interferers showed significant energy at DC and near 60 Hz as seen in FIG. 6 (a) and (b) respectively. The monitor was the primary source of 60 Hz energy, as scanning across 128×128 blocks showed mostly Gaussian noise until crossing onto blocks that contained the monitor, where a very large 60 Hz spike dominated the spectral plot.

Figure 7:
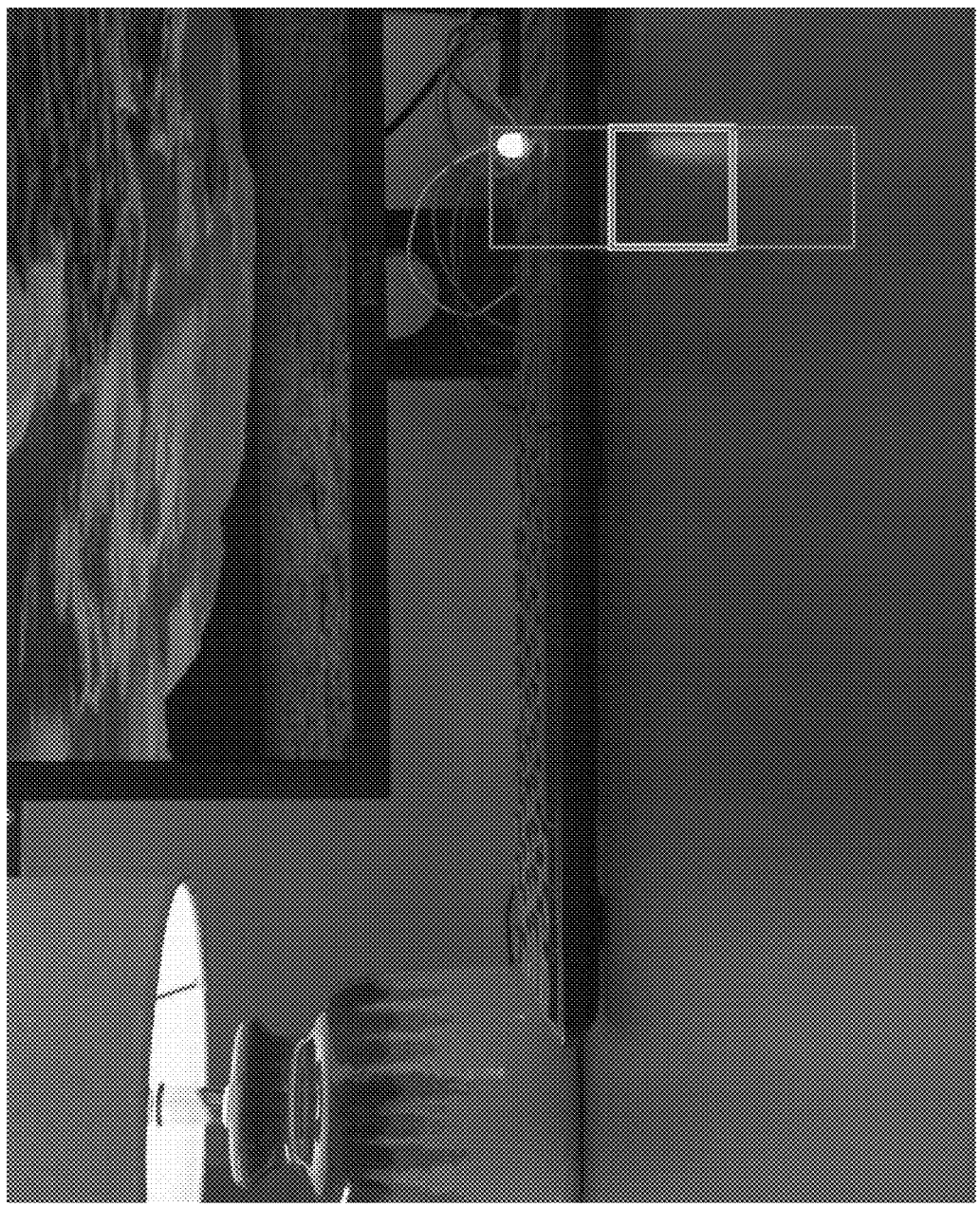
FIG. 7 shows embedded optical communication identified in a focused scene according to an example embodiment of this disclosure.
Figures 8A, 8B:
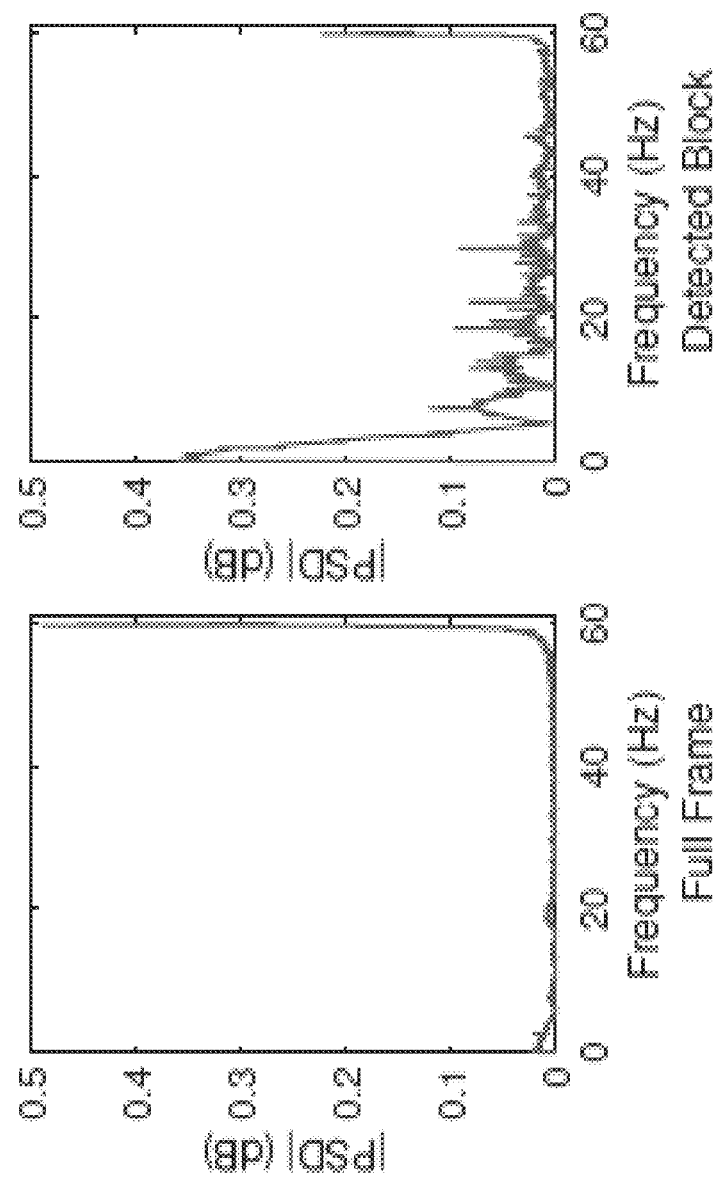
FIGS. 8A and 8B shows spectrums with optically embedded data transmitted from an led, FIG. 8A associated with a full frame and FIG. 8B associated with a detected block.
Figure 9:
FIG. 9 shows optically embedded data identified in a room scene at 3 meters according to an example embodiment of this disclosure.

Attempting to identify embedded optical communication by taking the FFT of the average luminance of the entire video frame was infeasible. As expected, the DC and 60 Hz power dominated, and the significantly lower power of the LED was near the noise floor. However, scanning the frame block-by-block, the additional spectral energy in the passband was identified both in the focused scene and from farther away at 3 meters. FIG. 7 shows the identification of embedded optical communication from 1 meter. FIG. 8, shows the compared spectrum of the full frame (a) corresponding to FIG. 7 versus the spectrum in the highlighted block (b). FIG. 9 shows the areas of abnormal spectral content from a distance of 3 meters, again correctly highlighting the LED as a potential source of information while filtering the spectral content from the lamp and monitor.

Figures 11A, 11B:
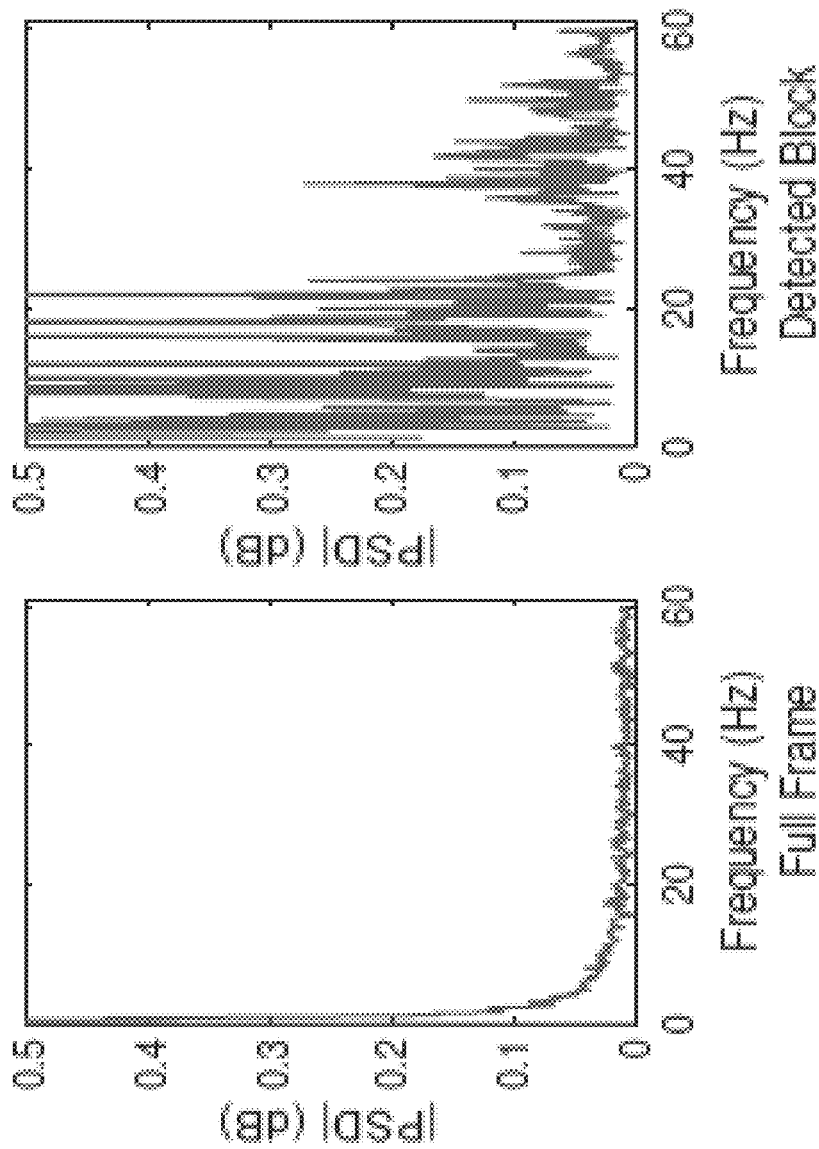
FIGS. 11A and 11B shows spectrum power spectral density with data optically embedded in monitor brightness, FIG. 11A associated with a full frame and FIG. 11B associated with a detected block.

Shifting from optically embedded signals on LEDs to monitors, the modulated monitor brightness was identified across all tests with the signal in varied locations and recordings at 120 and 240 Hz. FIG. 10 shows the successful identification of the modulating monitor collected at 120 Hz from 5 meters. FIG. 11 contrasts the overall power spectral density of the larger scene (a) in FIG. 10, with the observed spectral anomalies (b) caused by the modulating monitor in the highlighted block. Five meters away from the monitors in the full office scene, white Gaussian noise dominated the background spectrum in FIG. 11 (a). While this is different than the background spectrum in the LED tests, dominated by 60 Hz noise from the monitor in FIG. 8 (a), in both cases, spectral divergence was easily identified.

Two observations are of note in the experimental results.

First, in FIG. 7, the maximum e delta was found in the spectral reflection off of the desktop since it diffused frequency changes across more pixels than the values more concentrated near the LED itself. This result is still a success since it would enable network defenders to correctly identify an embedded optical communication and rapidly identify the source based on the results of the algorithm. Second, while the transmitting LED was correctly identified in FIG. 9, another block was also identified as having spectral divergence from the rest of the scene. The network team would have correctly found the data leak, but calibration to specific environments will help minimize the probability of false alarms. The need for calibration was also seen in the second round of testing with modulated monitor brightness. Amid all the noise native to the refreshing displays, the correct monitor was always highlighted, but a threshold of 4 standard deviations was needed to prevent any spurious blocks on other monitors.

All tests were successful for the primary objective of detecting embedded optical communications. Like most network security applications, tailoring to specific environments will increase effectiveness and reduce false alarms. However, identification of a potential threat alone is significant and allows follow-on security measures ranging from putting a piece of tape over an offending LED to alerting the rest of the information security team to potential intruders in the network.

V. CONCLUSION

Optical out-of-band communications are a proven capability, with a long-felt need to address the security risks they pose to networks and critical information. Detection is the critical first step in countering this threat. The adversary can easily modulate signals fast enough to be undetectable by the naked eye. Brightness or blinking alone would not allow a security team to identify nefarious activity in an office setting with many devices flickering as part of their routine operation. At the same time, analysis of each individual light source cannot be cost-effectively scaled.

This disclosure, and the example embodiments described, provides a method and system to identify and locate optical data leaks from computer networks. While other frequency detection methods have been used for radio frequency detection, this disclosure proves the practical application of a new technique to locate suspicious optical emanations. The approach presented successfully capitalizes on the KL-divergence in the spectrum generated by the entropy of the embedded message to identify potential problems quickly and at a low cost. Leveraged is the fact that the entropy of optically leaked information will necessarily produce frequency artifacts that can be separated from the ambient environment. Attempts to avoid detection of embedded optical communication using the disclosed method rely on reducing the information embedded in the optical channel. This is the network defender's end goal, suppressing the exfiltration of valuable data.

Developed and demonstrated is the capability to empower network defenders to counter the threat of out of-band optical data leaks. The recording frame rates used do not require expensive or exotic hardware and the search algorithm is underpinned by FFTs, which are extremely fast on modern devices. Given the lightweight requirements for this approach, it could be scaled to inexpensive handheld devices to allow information security teams to conduct optical bug sweeps in sensitive areas or even integrated into video surveillance, finally providing a means to begin to tackle the out-of-band optical channel.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

What is claimed is:

1. A method of detecting computer network data leaks over optical channels comprising:
   capturing a video of a target area;
   subdividing frames of the video into smaller blocks to generate a plurality of video clips;
   applying a Fast Fourier transform (FFT) to the plurality of video clips, wherein an average luminance of the plurality of video clips is represented in the frequency domain;
   applying a bandpass filter to the frequency domain representations, wherein the bandpass filter eliminates one or more strong tones in the plurality of video clips;
   analyzing the spectral divergence of the bandpass filtered frequency domain representation; and
   identifying suspect transmissions, wherein suspect transmissions are areas having higher spectral entropy in the plurality of video clips.

2. The method of claim 1, further comprising:
   displaying a representation of one bandpass filtered representation, wherein suspected areas having a high spectral entropy are highlighted.

3. The method of claim 1, further comprising:
   performing a threshold comparison for each video clip prior to applying the bandpass filter.

4. The method of claim 1, wherein the average luminance is the spectral density of an area.

5. The method of claim 1, wherein the one or more strong tones are selected from the group consisting of: task lighting, room lighting, outside ambient noise, or combination thereof.

6. The method of claim 1, wherein the identified suspect areas are modulated optical transmissions selected from the group consisting of: a keyboard light, a computer monitor screen, a hard drive status LEDs, peripheral indicator lights, or any combination thereof.

7. The method of claim 1, further comprising:
   calculating the power spectral density of an ambient environment, wherein the power spectral density of an environment is background noise.

8. A system for detecting computer network data leaks over optical channels comprising:
   a video capturing device; and
   a video processing unit;
      wherein the video processing unit is the video capturing device;
   the system performing a method of detecting computer network data leaks over optical channels comprising:
   capturing a video of a target area;
   subdividing frames of the video into smaller blocks to generate a plurality of video clips;
   applying a FFT to the plurality of video clips, wherein an average luminance of the plurality of video clips is represented in the frequency domain;
   applying a bandpass filter to the frequency domain representations, wherein the bandpass filter eliminates one or more strong tones in the plurality of video clips;
   analyzing the spectral divergence of the bandpass filtered frequency domain representation; and
   identifying suspect transmissions, wherein suspect transmissions are areas having higher spectral entropy in the plurality of video clips.

9. The system of claim 8, displaying one or more video clips on a video display;
   wherein the one or more video clips is a representation of a bandpass filtered frequency domain representation; and
   wherein the one or more video clips highlights an area with a high spectral entropy.

10. The system of claim 8, further comprising:
    performing a threshold comparison for each video clip prior to applying the bandpass filter.

11. The system of claim 8, wherein the one or more strong tones are associated with an ambient light signal and an associated power spectral density is calculated indirectly as an autocorrelation.

12. The system of claim 8, wherein the one or more strong tones are selected from the group consisting of: task lighting, room lighting, outside ambient noise, or combination thereof;
   wherein the system calculates the power spectral density of an ambient environment; and
   wherein the power spectral density is a FFT of an autocorrelation of one or more strong tones of the plurality of video clips.

13. The system of claim 8, wherein the identified suspect areas are modulated optical transmissions selected from the group consisting of: a keyboard light, a computer monitor screen, a hard drive status LEDs, peripheral indicator lights, or any combination thereof.

14. The system of claim 8, further comprising:
   calculating the power spectral density of an ambient environment, wherein the power spectral density is a FFT of an autocorrelation of one or more strong tones of the plurality of video clips.

15. A method of detecting computer network data leaks over optical channels comprising:
   capturing a video of a target area;
   subdividing frames of the video into smaller blocks to generate a plurality of video clips;
   generating a corresponding frequency domain representation of an average luminance of each of the video clips;
   applying a bandpass filter to each of the frequency domain representations, wherein one or more strong tones are eliminated;
   analyzing the spectral divergence of the bandpass filtered frequency domain representation; and
   identifying suspect transmissions, wherein suspect transmissions are areas having higher spectral entropy in the plurality of video clips.

16. The system of claim 15, further comprising:
   displaying a representation of one bandpass filtered representation, wherein suspected areas having a high spectral entropy are highlighted.

17. The system of claim 15, further comprising:
   performing a threshold comparison for each video clip prior to applying the bandpass filter.

18. The system of claim 15, wherein the one or more strong tones are associated with an ambient light signal and an associated power spectral density is calculated indirectly as an autocorrelation.

19. The system of claim 15, wherein the one or more strong tones are selected from the group consisting of: task lighting, room lighting, outside ambient noise, or combination thereof.

20. The system of claim 15, wherein the identified suspect areas are modulated optical transmissions selected from the group consisting of: a keyboard light, a computer monitor screen, a hard drive status LEDs, peripheral indicator lights, or any combination thereof.

* * * * *